(12) United States Patent
Montojo et al.

(10) Patent No.: US 9,084,277 B2
(45) Date of Patent: Jul. 14, 2015

(54) METHOD AND APPARATUS FOR UL ACK ALLOCATION

(75) Inventors: Juan Montojo, San Diego, CA (US); Durga Prasad Malladi, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1410 days.

(21) Appl. No.: 12/114,137

(22) Filed: May 2, 2008

(65) Prior Publication Data

US 2008/0273513 A1 Nov. 6, 2008

Related U.S. Application Data

(60) Provisional application No. 60/916,231, filed on May 4, 2007.

(51) Int. Cl.
*H04B 7/216* (2006.01)
*H04L 1/18* (2006.01)
*H04L 5/00* (2006.01)
*H04W 72/12* (2009.01)
*H04L 1/00* (2006.01)
(Continued)

(52) U.S. Cl.
CPC ......... *H04W 72/1257* (2013.01); *H04L 1/1854* (2013.01); *H04L 5/0023* (2013.01); *H04L 5/0053* (2013.01); *H04L 5/0094* (2013.01); *H04L 1/0026* (2013.01); *H04L 1/1607* (2013.01); *H04W 72/04* (2013.01); *H04W 72/1268* (2013.01)

(58) Field of Classification Search
USPC ......................................... 370/330
See application file for complete search history.

(56) References Cited

U.S. PATENT DOCUMENTS 6,816,478 B1 11/2004 Laroia et al.
7,636,328 B2 12/2009 Teague et al.
(Continued)

FOREIGN PATENT DOCUMENTS

EP 1746855 1/2007
JP 11355860 A 12/1999
(Continued)

OTHER PUBLICATIONS

Partial International Search Report, PCT/US2008/062684—International Search Authority—European Patent Office—Nov. 6, 2008.
(Continued)

*Primary Examiner* — Sulaiman Nooristany
(74) *Attorney, Agent, or Firm* — Peng Zhu

(57) ABSTRACT

Systems and methodologies are described that facilitate allocation of uplink acknowledgement (ACK) resources for a wireless communication system. Various aspects described herein facilitate explicit creation and transmission of a bundled assignment of downlink communication resources and uplink resources for ACK transmission, thereby facilitating overhead-efficient ACK allocation for users that can communicate pursuant to a persistent resource assignment without requiring scheduling information from an associated control channel. Additionally, indexing schemes for uplink ACK resources are provided herein to facilitate ACK allocation for systems in which both scheduled and persistent users can communicate at a common transmission time interval (TTI).

33 Claims, 13 Drawing Sheets

(51) Int. Cl.
*H04L 1/16* (2006.01)
*H04W 72/04* (2009.01)

(56) References Cited

U.S. PATENT DOCUMENTS

| | | | |
|---|---|---|---|
| 8,565,194 | B2 | 10/2013 | Gorokhov et al. |
| 2005/0117536 | A1 | 6/2005 | Cho et al. |
| 2005/0250497 | A1* | 11/2005 | Ghosh et al. ............. 455/436 |
| 2005/0286402 | A1* | 12/2005 | Byun et al. ............. 370/203 |
| 2006/0205414 | A1 | 9/2006 | Teague |
| 2006/0264218 | A1* | 11/2006 | Zhang et al. ............. 455/450 |
| 2007/0097853 | A1 | 5/2007 | Khandekar et al. |
| 2007/0097981 | A1 | 5/2007 | Papasakellariou |
| 2007/0133458 | A1* | 6/2007 | Chandra et al. ............. 370/329 |
| 2007/0211616 | A1 | 9/2007 | Khandekar et al. |
| 2008/0205348 | A1* | 8/2008 | Malladi ............. 370/335 |

FOREIGN PATENT DOCUMENTS

| | | |
|---|---|---|
| JP | 2010515332 A | 5/2010 |
| RU | 2216105 C2 | 11/2003 |
| WO | WO0101609 A1 | 1/2001 |
| WO | WO2005117385 | 8/2005 |
| WO | WO-2006130742 A1 | 12/2006 |
| WO | WO-2007051158 | 5/2007 |
| WO | 2008085000 A1 | 7/2008 |

OTHER PUBLICATIONS

European Search Report—EP09172472—Search Authority—Munich—Nov. 23, 2009.
International Search Report and Written Opinion—PCT/US2008/062684—ISA/EPO—Oct. 2, 2009.
LG Electronics, "Uplink ACK/NACK Index Mapping", 3GPP RAN WG1 #48-BIS R1-071547, Mar. 26, 2007.
NTT DoCoMo, et al., "ACK/NACK Signal Structure in E-UTRA Downlink", 3GPP TSG RAN WG1 Meeting #48bis R1-071656, Mar. 26, 2007.
IEEE Standard for Local and Metropolitan Area Networks Part 16: Air Interface for Fixed and Mobile Broadband Wireless Access Systems Amendment 2: Physical and Medium Access Control Layers for Combined Fixed and Mobile Operation in Licensed Bands and Corrigendum 1;IEEE Std 802.16e-2005 and IEEE Std 8 802.16E-2005 and IEEE Std 802.16-2004/COR1-2005 IEEE Standard for Local and Metropolitan Area Networks Part 16: Air Interface for Fixed and Mobile Broadband Wireless Access Systems Amendment 2: Physical and Medium Access Control Layers for Combined F, Jan. 1, 2006, pp. 1-822, XP017603857 ISBN: 978-0-7381-4856-4 paragraph [6.3.2.3.42].
Taiwan Search Report—TW097116554—TIPO—May 22, 2013.

* cited by examiner

METHOD AND APPARATUS FOR UL ACK ALLOCATION

CROSS-REFERENCE

This application claims the benefit of U.S. Provisional Application Ser. No. 60/916,231, filed May 4, 2007, and entitled "A METHOD AND APPARATUS FOR ALLOCATING UL ACK," the entirety of which is incorporated, herein by reference.

BACKGROUND

I. Field

The present disclosure relates generally to wireless communications, and more specifically to techniques for resource allocation in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-single-out (MISO), or a multiple-in-multiple-out (MIMO) system.

Downlink communication in a wireless communication system can be conducted by a Node B or access point by transmitting information to a user equipment (UE) or terminal. In response to information transmitted to a UE on the downlink, the UE can respond with an acknowledgement (ACK) to the Node B on the uplink using ACK resources assigned to the UE by the Node B. Conventionally, however, allocation of ACK resources in a wireless communication system has involved significant overhead. For example, existing techniques provide that uplink ACK resources can be mapped to downlink communication resources, but this technique requires excessive overhead if relatively few UEs utilize a significant portion of the downlink resources. Alternatively, other existing techniques for allocation of ACK resources involve mapping such resources to control channels used for communication with respective UEs. However, this technique is ineffective for UEs that do not utilize a control channel for communication with a Node B, such as UEs communicating pursuant to a persistent resource assignment. Further complications arise when persistently-assigned UEs operate in a system with UEs that rely on respective control channels for their communication functionality. Thus, there is a need for low-overhead techniques for ACK allocation that support UEs that communicate based on persistent resource assignments.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for assigning uplink acknowledgement (ACK) resources for a user equipment (UE) in a wireless communication system is described herein. The method can comprise identifying a UE for which a persistent assignment of communication resources is to be established; identifying uplink ACK resources for use by the identified UE; and communicating an assignment of the identified uplink ACK resources with a persistent assignment of communication resources to the UE.

Another aspect relates to a wireless communications apparatus that can comprise a memory that stores data relating to a wireless terminal for which communication resources are to be persistently assigned and a set of ACK resources. The wireless communications apparatus can further comprise a processor configured to select ACK resources to be used by the wireless terminal from the set of ACK resources and to communicate a bundled persistent assignment of downlink communication resources and the selected ACK resources to the wireless terminal.

Yet another aspect relates to an apparatus that facilitates allocation of acknowledgement resources in a wireless communication system. The apparatus can comprise means for identifying acknowledgement resources for an access terminal to which a persistent assignment of communication resources is to be communicated and means for communicating an explicit assignment of the identified acknowledgement resources to the access terminal with the persistent assignment of communication resources.

Still another aspect relates to a computer-readable medium, which can comprise code for causing a computer to allocate ACK resources for a user in a wireless communication system and code for causing a computer to bundle an assignment for the allocated ACK resources with a persistent resource assignment for the user.

An additional aspect relates to an integrated circuit that executes computer-executable instructions for coordinating resources for uplink ACK transmission. The instructions can comprise identifying one or more pools of resources for uplink ACK transmission; determining resources for uplink ACK transmission for a UE to be persistently assigned downlink communication resources; and assigning the determined ACK resources to the UE in a persistent assignment for downlink communication resources.

According to another aspect, a method for identifying allocated acknowledgement resources in a wireless communication system is described herein. The method can comprise receiving an index among information received from a Node B; identifying an offset among the information received from the Node B; and configuring acknowledgement communication to utilize acknowledgement resources in an indexed pool of acknowledgement having ah index corresponding to the received index plus the identified offset.

According to yet another aspect, a wireless communications apparatus is described herein that can comprise a memory that stores data relating to an index and an index offset received from an access point. The wireless communications apparatus can further comprise a processor configured to add the index and the index offset to obtain a resulting index and to utilize acknowledgement resources from an allocated set of acknowledgement resources corresponding to the resulting index.

Another aspect relates to ah apparatus that facilitates determining uplink ACK resources for communication with a wireless access point. The apparatus can comprise means for receiving an index and a number of persistently assigned users among information received from a wireless access point and determining uplink ACK resources for communication with the wireless access point at least in part by identifying ACK resources from a resource pool having an index corresponding to the received index plus the received number of persistently assigned users.

Still another aspect relates to a computer-readable medium, which can comprise code for causing a computer to identify an index communicated by a Node B; code for causing a computer to identify an offset value communicated by the Node B; code for causing a computer to offset the identified index by the identified offset value to produce an offset index; and code for causing a computer to utilize resources for acknowledgement transmission based at least in part on the offset index.

A further aspect relates to an integrated circuit that executes computer-executable instructions for identifying radio spectrum allocated for uplink ACK communication in a wireless communication system. The instructions can comprise receiving an index corresponding to an allocated subset of radio spectrum; receiving information relating to persistent resource assignments present in the wireless communication system; and offsetting the received index based on the information relating to persistent resource assignments in the wireless communication system to obtain an index corresponding to an assigned subset of radio spectrum for uplink ACK communication.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
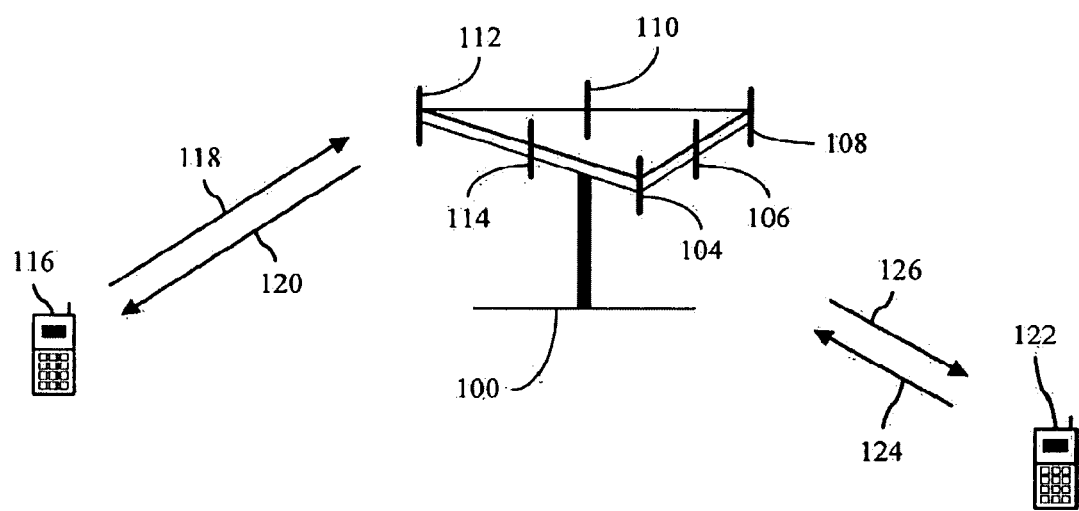
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone; PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer, to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from, any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile, Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems, that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 104 and 106, where antennas 104 and 106 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group, of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable, terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
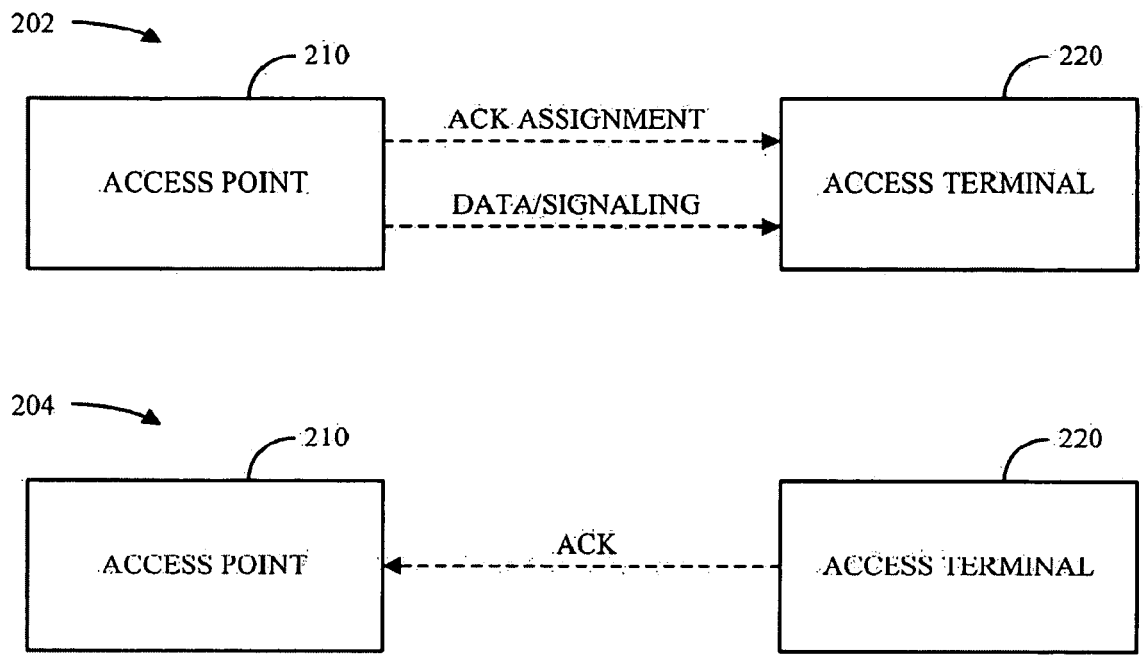
FIG. 2 illustrates example communications that can be conducted within a wireless communication system in accordance with various aspects.

FIG. 2 is a series of block diagrams 202 and 204 that illustrate, example communications that can be conducted within a wireless communication system in accordance with various aspects described herein. In one example, a wireless communication system illustrated by block diagrams 202 and 204 includes an access point (AP) 210 and an access terminal (AT) 220. AP 210 and AT 220 can communicate on forward and reverse links, as respectively illustrated by block diagrams 202 and 204. As used herein and generally in the art, the forward link (or downlink) refers to the communication link from an AP to an AT, and the reverse link (or uplink) refers to the communication link from an AT to an AP. In addition, it should be appreciated that while diagrams 202 and 204 illustrate communication between a single AP 210 and a single AT 220, communication as illustrated by diagrams 202 and 204 can be conducted between any suitable number of APs 210 and/or ATs 220.

In accordance with one aspect, diagram 202 illustrates, downlink communication from AP 210 to AT 220. As illustrated by diagram 202, AP 210 can communicate data, control signaling, and/or other suitable information to AT 220 on the downlink. Further, AP 210 can transmit an assignment for acknowledgement (ACK) resources for use by AT 220 on the uplink in response to corresponding information transmitted by AP 210 on the downlink. In one example, an ACK resource assignment can be transmitted by AP 210 at a common time interval with corresponding information or at a different time interval. Additionally and/or alternatively, uplink ACK resources can be implicitly assigned by linking to a corresponding Physical Downlink Control Channel (PDCCH) index, which can be the first Control Channel Element (CCE) utilized by the PDCCH.

Based on an ACK assignment received on the downlink as illustrated by diagram 202, AT 220 can then communicate an ACK back to AP 210 on the uplink in response to information communicated to AT 220 on the downlink as illustrated by diagram 204. An ACK transmitted by AT 220 can be an acknowledgement of successfully received information, an indication that information was not successfully received (e.g., a negative ACK or NACK), and/or any other appropriate indication.

In accordance with one aspect, the system illustrated by diagrams 202-204 can utilize an orthogonalized uplink such that communications by ATs 220 on the uplink are conducted on predetermined and pre-allocated resources. In one example, AP 210 can allocate resources for use by an AT 220 on the uplink and communicate an assignment of these allocated resources to an AT 220 as illustrated by diagram 202. In one example, resources allocated by AP 210 can occupy a predetermined portion of a radio spectrum used by the associated communication system. Additionally and/or alternatively, multiple ATs 220 can be assigned resources occupying the same portion of the frequency spectrum. In such an example, techniques such as CDMA can be used to facilitate unique identification of signals transmitted by multiple ATs 220 from a common portion of the radio spectrum.

Figure 3:
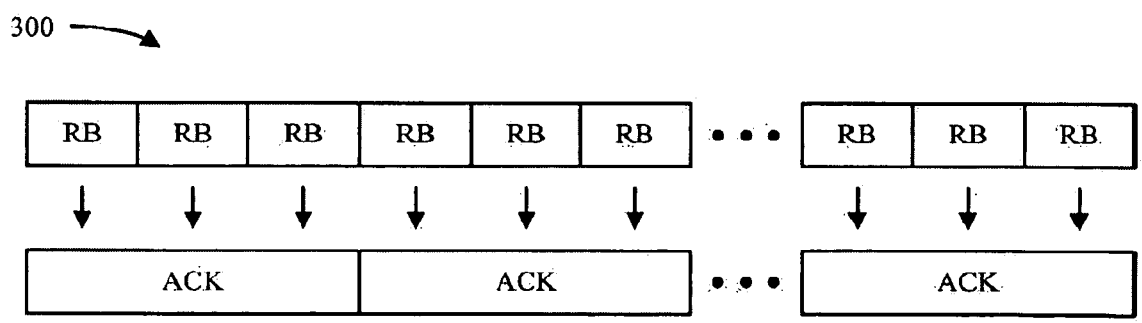
FIG. 3 illustrates an example acknowledgement resource allocation technique in accordance with various aspects.

In accordance with another aspect, ACK resources assigned by AP 210 for use by an AT 220 can be allocated in various manners. For example, ACK resources can be allocated by performing a mapping from downlink virtual resources to uplink ACK resources as shown by diagram 300 in FIG. 3. As diagram 300 illustrates, resources to be assigned for ACK transmission at a given AT can be mapped to one or more corresponding resource blocks (RBs) on which information is communicated to the AT on the downlink.

As diagram 300 further illustrates, a mapping of downlink virtual resources to uplink ACK resources can incur ah overhead that is equal to the number of RBs utilized by an associated communication system divided by the minimum number of RBs that can be allocated per transmission. Thus, in the specific, non-limiting example of diagram 300, respective blocks, of resources corresponding to one ACK transmission can be mapped to corresponding sets of RBs allocated for downlink transmission. Based on this association between downlink resources and uplink ACK resources, an assignment of ACK resources can be implicitly made by providing information relating to the related downlink RBs.

It can be appreciated, however, that the mapping illustrated by diagram 300 requires a significant amount of resource overhead. By way of example, in a case wherein a single user is assigned the entire bandwidth of an associated communication system, the user will also be allocated ACK resources corresponding to, every group of RBs in the system bandwidth. However, it should be appreciated that a single ACK allocated to the user would be sufficient in such a case, thereby rendering any remaining allocated ACK resources redundant and unneeded. It should further be appreciated that in the case of downlink Spatial Division Multiple Access (SDMA), multiple users can share the same set of RBs. If ACK resources are allocated corresponding to RBs in such a case, multiple users can attempt to transmit ACK information on the same set of resources, thereby causing collisions.

As a result of this observation, other ACK allocation schemes have been developed in an attempt to reduce the amount of overhead associated with ACK resources assigned to respective users. In one such example, ACK resources are allocated by mapping respective ACK resources to downlink control channels used for scheduling communication resources for respective users. An assignment of ACK resources, as illustrated by diagram 202 in FIG. 2, can then be communicated based on a control channel scheduled for a particular AT 220. In one example, control channels are utilized to provide information to facilitate location of transmission resources, identification of modulation and/or coding schemes utilized for transmission, and the like. Accordingly, respective users in a wireless communication system generally require only a single control channel. For this reason, by mapping ACK resources to control channels, ACK overhead can be reduced as compared to the mapping illustrated by diagram 300 by ensuring that a particular user receives only a single ACK under normal circumstances. Further, mapping ACK resources to respective control channels and assigning different users to different control channels can additionally resolve the collision issues noted above with respect to SDMA.

Figure 4:
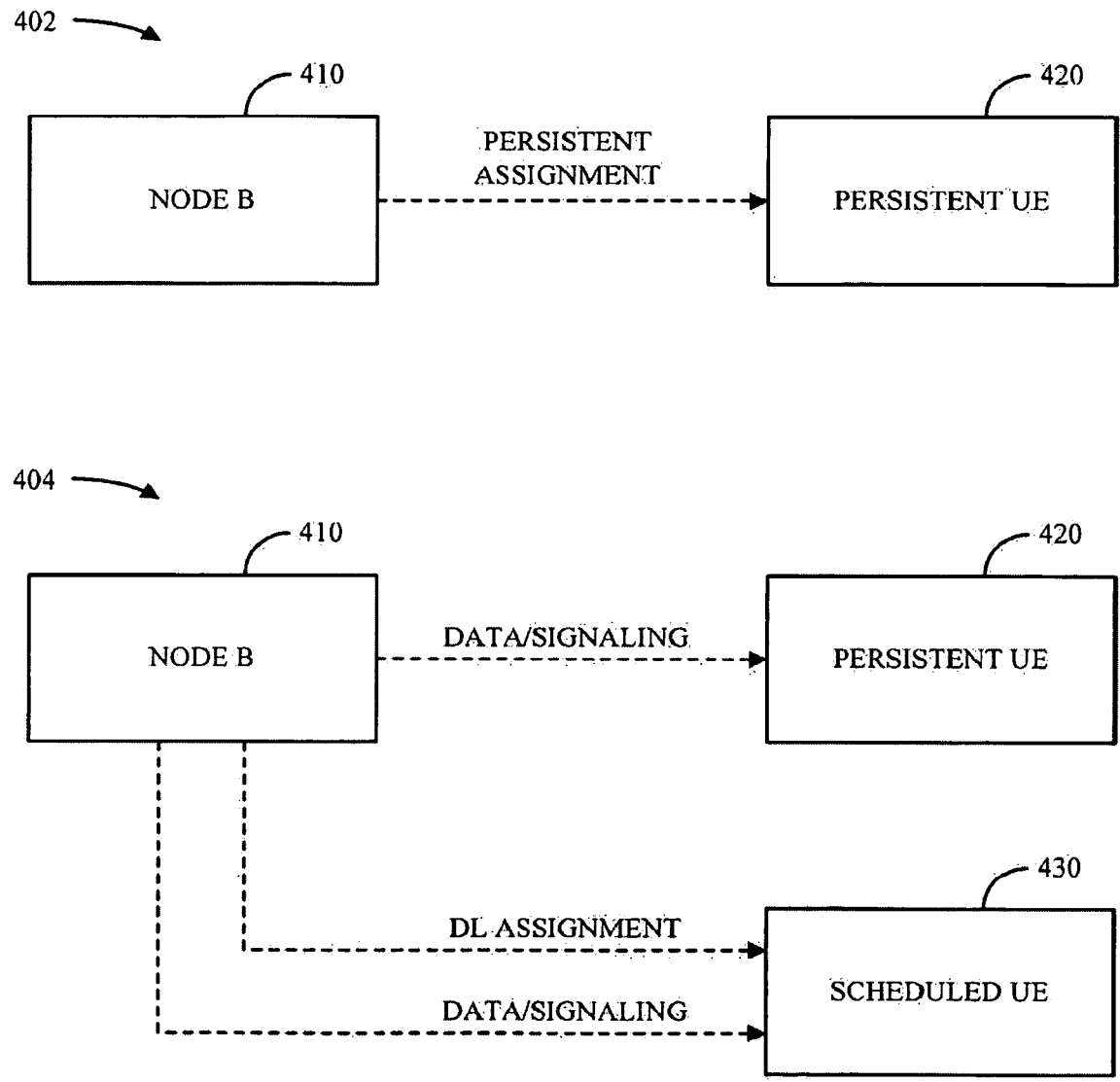
FIG. 4 illustrates example communications that can be conducted within a wireless communication system in accordance with various aspects.

While it can be seen that ACK resource allocation based on a control channel mapping reduces overhead as compared to a resource-based mapping, however, it can additionally be appreciated that a control channel ACK mapping is ineffective for users that operate according to persistent, "controlless" resource, assignments. An example of communication between a Node B 410 and a UE 420 pursuant to a persistent resource assignment is illustrated by diagrams 402-404 in FIG. 4. In one example, communication, pursuant to a persistent resource assignment is initialized as illustrated in diagram 402, wherein a persistent assignment is communicated to a UE 420. As used in FIG. 4, UE 420 is denoted as a "persistent UE" due to the fact that it receives a persistent assignment of resources. A persistent assignment as illustrated by diagram 402 can specify resources that can be used by a persistent UE 420 for downlink communication subsequent to the assignment. Further, a persistent assignment can be used for a predetermined duration (e.g., an amount of time, a number of frames, etc.) or until a new persistent assignment is provided. In one example, a persistent assignment can be communicated to a UE 420 via Layer 2 (L2) signaling, Layer 3 (L3) signaling, or the like.

Once a persistent resource assignment has been established, a Node B 410 and a persistent UE 420 can then subsequently communicate pursuant to the persistent assignment as illustrated by diagram 404. In one example, communication between a Node B 410 and a persistent UE 420 can be conducted without requiring a downlink resource assignment and/or control channel communication at each subframe, as is generally required/for a communication between a Node B 410 and a scheduled UE 430, illustrated in diagram 404 by way of comparison.

In accordance with one aspect, ACK resources can be allocated in an efficient manner for persistent UEs 420 as illustrated by diagrams 402-404 by explicitly assigning ACK resources to be used by a persistent UE 420 and supplying that assignment in a persistent assignment to the UE 420 and/or in a manner similarly associated with such a persistent assignment. An explicit assignment of ACK resources can be made in various manners. For example, an explicit allocation of resources for ACK transmissions can be made through L2 signaling via a control channel such as a Physical Downlink Control Channel (PDCCH) and/or any other suitable L2 channel. In such an example, physical resources for ACK transmission can be assigned on a persistent scheduling assignment inside the control channel. In accordance with an aspect, conducting ACK assignment in this manner can be achieved by transmitting an uplink ACK index or identifier within a PDCCH and/or another L2 control channel.

In another example, an explicit allocation of physical resources for uplink ACK transmissions can be made through L3 signaling via a message on a data channel such as a Physical Downlink Shared Channel (PDSCH) and/or any other suitable L3 channel. In such an example, the physical resources for uplink ACK transmission can be assigned on a persistent scheduling assignment inside the data channel. In accordance with one aspect, transmission of an ACK assignment over either L2 or L3 signaling as described in the examples above can be conducted by grouping a downlink persistent resource assignment with an uplink, allocation for uplink ACK transmission.

Figure 5:
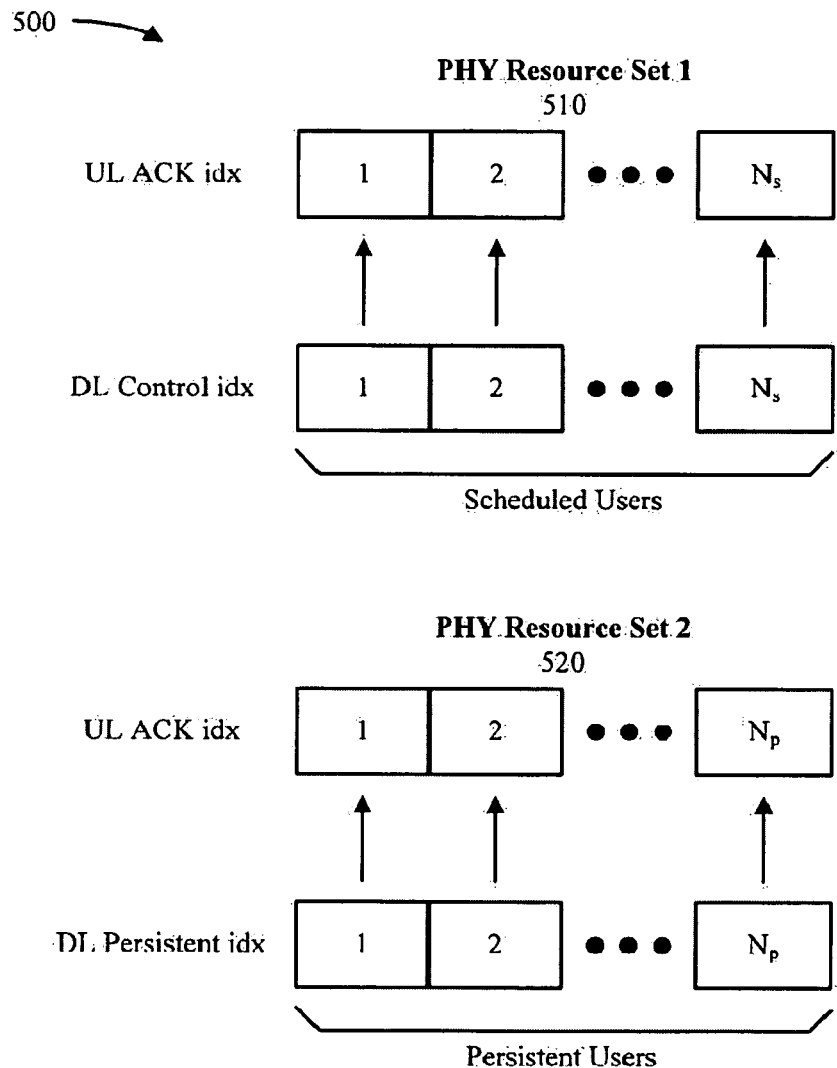
FIGS. 5-7 illustrate example acknowledgement resource allocation techniques in accordance with various aspects.
Figure 6:
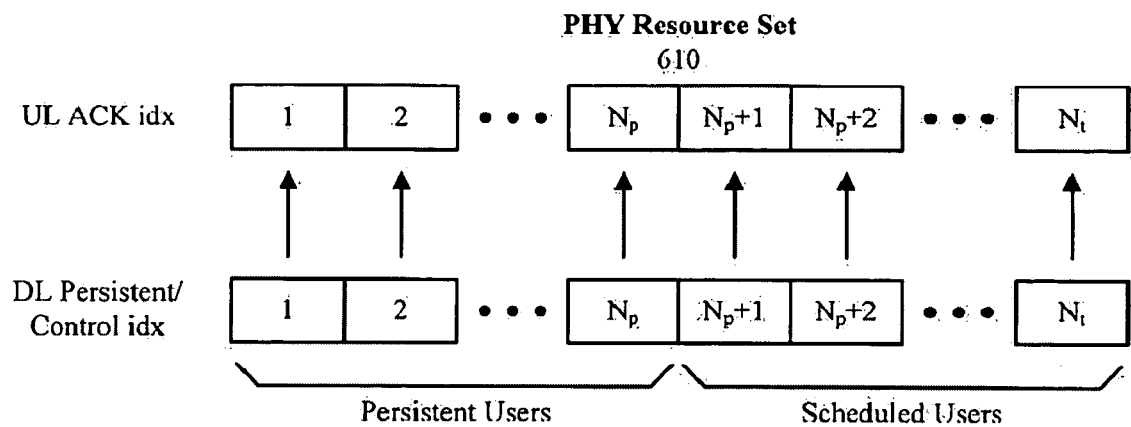
Figure 7:
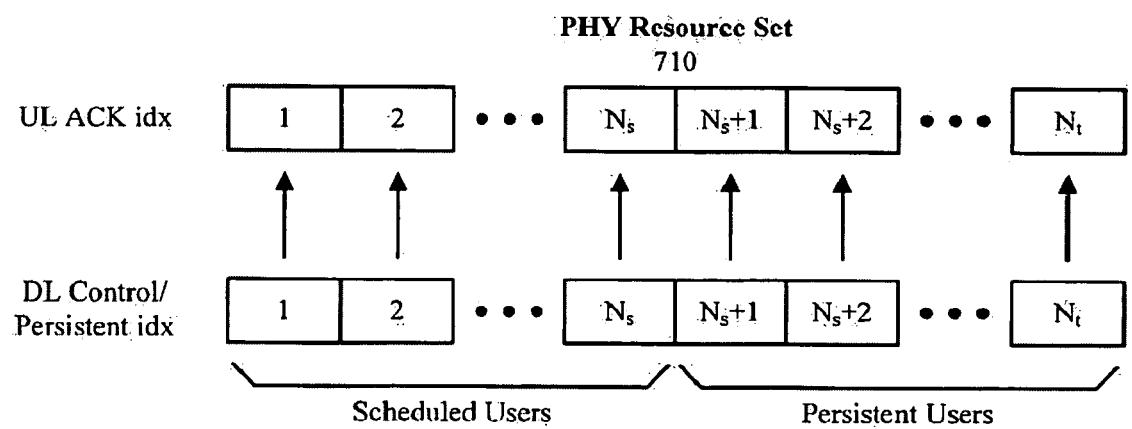

Referring now to FIGS. 5-7, respective example ACK allocation schemes are illustrated in accordance with various aspects provided herein. In accordance with one aspect, resource overhead for control channels on the uplink can be provided in multiples of a minimum RB size (e.g., 180 kHz or 12 subcarriers). Uplink control channels utilizing these provided resources can be used for ACK transmission as well as for various other signaling transmissions, such as channel quality indicator (CQI) transmission and the like. In one example, users subject to persistent resource assignments can obtain control channel resources for use on the uplink pursuant to an explicit assignment of such resources as generally described supra. On the other hand, uplink control channel resources for scheduled users can be implicitly assigned based on downlink control channels used for communications to respective scheduled users. As a result, if a system contains both persistent and scheduled users, it can be appreciated that control channel resources assigned in these disparate manners can potentially conflict with one another. As a result, a resource control scheme can be utilized in accordance with one aspect to allow scheduled and persistent assignments to coexist within the same subframe without overlap and/or other conflicts with one another.

In one example, conflict-free allocation of ACK resources for both persistent and scheduled users is accomplished by indexing the physical resources allocated for ACK transmissions for both scheduled and persistent users. By indexing the resources, a Node B and/or the users with which the Node B communicates can be enabled to readily provide and/or determine information required for uniquely ascertaining the physical resources to be used for uplink ACK transmissions by a given user. Examples of techniques that can be utilized to index physical resources for ACK transmission are provided in the following description. In a first example, resources are allocated separately for persistent transmissions and for scheduled transmissions such that resources for ACK transmissions are not shared between the two types of users. In a second example, a pool of resources for uplink ACK transmission is shared for persistent and scheduled transmissions, and a shared index is generated for persistent and scheduled users. Both of these examples are described in further detail as follows. In the following description, $N_p$ is used to represent the number of persistent assignments at a transmission time interval (TTI), $N_s$ is used to represent the number of scheduled assignments in a TTI, and $N_t$ is used to represent the total number of resource assignments at a TTI, e.g., $N_t = N_p + N_s$.

FIG. 5 is a diagram 500 that illustrates the first example of ACK resource allocation described above. As illustrated by diagram 500, physical resources for uplink ACK transmission for persistent assignments and scheduled users can be allocated in a disjoint manner. More particularly, a first physical resource set 510 and a second physical resource set 520 for uplink ACK transmission can be respectively allocated for scheduled users and persistent users, respectively, such mat the resource sets 510 and 520 are not shared among scheduled users and persistent users.

In one example, resource sets 510 and 520 can be allocated in respective RBs such that the resource sets 510 and 520 utilize the entire bandwidth of their respective RBs. Alternatively, resource sets 510 and 520 can be allocated as disjoint portions of a common RB such that, for example, a resource set 510 for scheduled users occupies a first portion of the ACK resources and a resource set 520 for persistent users occupies a second portion of the ACK resources, or vice versa. In accordance with one aspect, assignments can be made from the separately allocated resource sets 510 and 520 to respective users by maintaining separate indices for scheduled users and persistent users and assigning ACK resources, in a resource set 510 or 520 to a user based on a determination of whether the user is persistent or scheduled and the corresponding index of the user.

Alternatively, FIGS. 6-7 comprise respective diagrams 600 and 700 that illustrate the second example of ACK resource allocation described above, wherein ACK resources are allocated as a common resource pool. It can be appreciated that, unlike the disjoint resource allocation illustrated by diagram 500, diagrams 600 and 700 illustrate techniques wherein a single set of resources for uplink ACK transmission are shared between persistent assignments and scheduled users. In one example, a common ACK resource set can be allocated as one or more RBs such that the resource set uses all or part of the bandwidth of the allocated RBs.

In accordance with one aspect, users can be assigned to respective allocated ACK resources by first grouping scheduled users and persistent users in the system. Based on this grouping, ACK resources for scheduled users can utilize a first portion of the allocated resource set and ACK resources for persistent users can utilize a second portion of the allocated resource set, or vice versa, as illustrated by diagrams 600 and 700. A unified indexing scheme can then be applied to the persistent and scheduled users to facilitate the assignment of unique allocated resources to respective users. In one example, unified indexing can be achieved by maintaining separate indices for the groups of persistent and scheduled users and applying an offset to one of the user groups corresponding to the number of users in the other user group. These and other example techniques are described in more detail as follows.

Referring now specifically to FIG. 6, a specific example of a shared ACK resource scheduling scheme that can be utilized in accordance with various aspects is illustrated by diagram 600. As diagram 600 illustrates, a physical resource set 610 for ACK transmissions can be shared between $N_p$ users with persistent assignments and $N_s$ (or $N_t - N_p$) scheduled users. In the example illustrated by diagram 600, users are grouped such that persistent users occupy a first subset of the resource set 610 and scheduled users occupy a second subset of the resource set 610.

In accordance with one aspect, users can be given an index upon which an assignment for corresponding ACK resources can be based. As diagram 600 illustrates, a group of $N_p$ persistent users can occupy the first ACK resources in the resource set 610, followed by a group of scheduled users. Accordingly, it can be appreciated that the first $N_p$ ACK resources in the resource set 610 can be occupiable by persistent users and that the following $N_t - N_p$ ACK resources can be occupiable by scheduled users. Based oh this observation, indexing can be achieved by maintaining separate indices for persistent users and scheduled users and adding an offset of $N_p$ to the indexes of respective scheduled users. Thus, in one example, persistent users can occupy ACK resources according to their respective indexes, and scheduled users occupy respective following ACK resources according to their indexes such that the first scheduled user occupies the first ACK resource after the $N_p$-th persistent user, and so on.

In one example, an assignment for ACK resources can be explicitly made to a persistent user based on the index of the user in connection with a persistent resource assignment thereto as generally described supra. Additionally and/or alternatively, an ACK assignment can be made implicitly to a scheduled user by supplying the index of the respective user along with the value of $N_p$ to the user (e.g., via a downlink control channel and/or another appropriate communication link or channel). Subsequently, the scheduled user can utilize its index and the value of $N_p$ to determine the ACK resources assigned thereto by, for example, adding the index with $N_p$ as illustrated in diagram 600.

Referring next to FIG. 7, an alternative specific example of a shared ACK resource scheduling scheme is illustrated by diagram 700. As diagram 700 illustrates, a physical resource set 710 for ACK transmissions can be shared between $N_s$ scheduled users and $N_p$ (or $N_t$–$N_s$) users with persistent assignments. In the example illustrated by diagram 700, users are grouped such that scheduled users occupy first resources in the resource set 710 and persistent users occupy remaining resources in the resource set 710.

In accordance with one aspect, users can be given an index upon which an assignment for corresponding ACK resources can be based in a similar manner to that described above with respect to diagram 600. As diagram 700 illustrates, the first Ns ACK resources in the resource set 710 can be occupiable by scheduled users and the following $N_t$–$N_s$ ACK resources can be occupiable by persistent users. Based on this observation, separate indices can be maintained for scheduled users and persistent users, and an offset of $N_s$ can be added to the respective indexes of persistent users such that, for example, the first persistent user occupies the resources immediately following those occupied by the $N_s$-th scheduled user.

In one example, an assignment for ACK resources can be made implicitly to a scheduled user by providing the user with its index (e.g., via a downlink control channel and/or another appropriate communication link or channel), thereby facilitating the use of ACK resources by the user corresponding to the index of the user. Additionally and/or alternatively, an ACK resource assignment can be explicitly made to a persistent user in connection with a persistent resource assignment thereto as generally described supra based on the index of the user. In one example, the index of ACK resources to be assigned to a persistent user in the resource set 710 can be determined prior to an assignment by adding the index of the persistent user to the value of $N_s$ as illustrated in diagram 700.

Referring to FIGS. 8-11, methodologies that can be utilized in accordance with various aspects described herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 8:
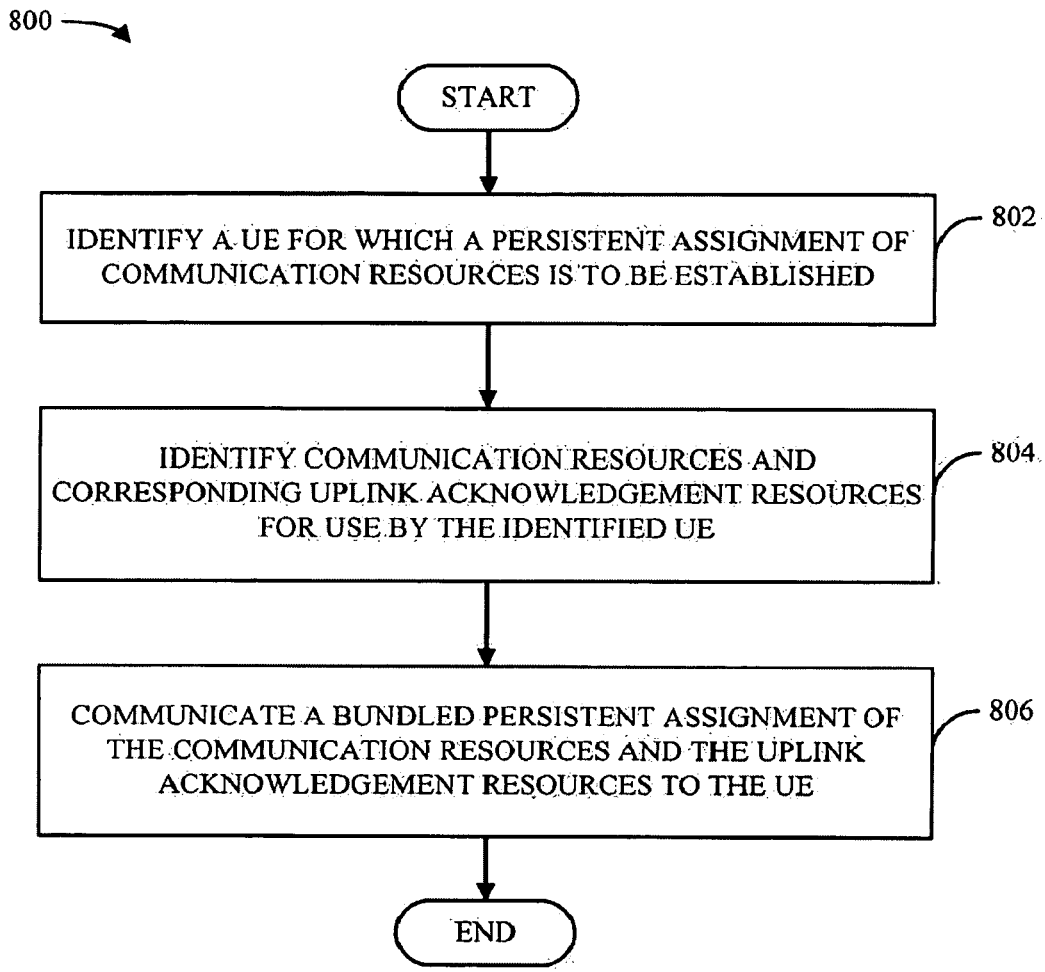
FIG. 8 is a flow diagram of a methodology for allocating acknowledgement resources for a user with a persistent resource assignment.

With reference to FIG. 8, illustrated is a methodology 800 for allocating acknowledgement resources for a user with a persistent resource assignment (e.g., persistent UE 420) in a wireless communication system (e.g., system 400). It is to be appreciated that methodology 800 can be performed by, for example, a Node B (e.g., Node B 410) and/or any other appropriate network entity. Methodology 800 begins at block 802, wherein a UE for which a persistent assignment of communication of resources is to be established is identified. In one example, a persistent resource assignment is initiated at block 802 to allocate communication resources for a definite or indefinite period of time such that communication over the allocated resources can be conducted without requiring use of a control channel. Methodology 800 can then continue to block 804, wherein communication resources and corresponding uplink acknowledgement resources for use by UE identified at block 802 are identified. Identification of acknowledgement resources as performed at block 804 can be achieved as illustrated by diagrams 500, 600, and/or 700, and/or in any other suitable manner.

Upon completing the act described at block 804, methodology 800 can conclude at block 806, wherein a bundled persistent assignment of the communication resources and uplink acknowledgement resources identified at block 804 is communicated to the UE identified at block 802. In accordance with one aspect, a bundled resource assignment can be communicated to a UE using L2 signaling, L3 signaling, and/or any other appropriate means. In accordance with another aspect, by explicitly assigning acknowledgement resources in this manner, acknowledgement resource allocation is facilitated that is more efficient than the resource-based allocation illustrated supra by diagram 300 and that can be utilized by UEs that do not utilize control channels for communication.

Figure 9:
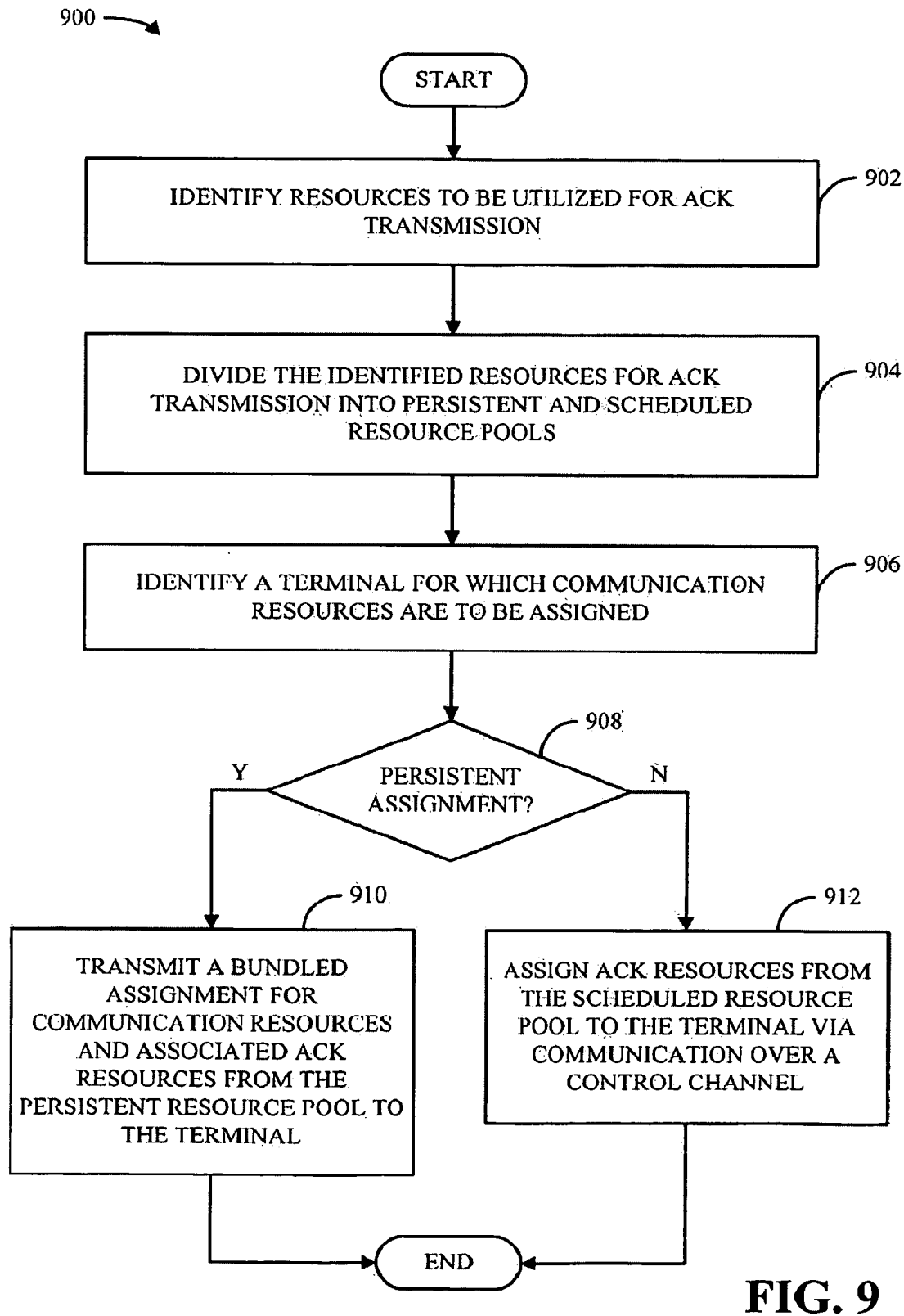
FIGS. 9-10 are flow diagrams of respective methodologies for acknowledgement resource assignment for terminals utilizing persistent resource assignments and terminals using scheduled resources.

FIG. 9 illustrates a methodology 800 for acknowledgement resource assignment for terminals utilizing persistent resource assignments (e.g., persistent UEs 420) and terminals using scheduled resources (e.g., scheduled UEs 430). Methodology 900 can be performed by, for example, a base station, and/or any other appropriate network entity. Methodology 900 begins at block 902, wherein resources to be utilized for ACK transmission are identified. Next, at block 904, the resources identified at block 902 are divided into persistent and scheduled resource pools (e.g., resource sets 510 and 520). In one example, resources identified at block 902 can comprise a plurality of RBs. In such an example, dividing performed at block 904 can include dividing the identified RBs among the resource pools such that each resource pool utilizes one or more whole RBs. Additionally and/or alternatively, the dividing performed at block 904 can include dividing a single RB identified at block 902 into disjoint persistent and scheduled resource pools.

Upon completing the acts described at block 904, methodology 900 can continue to block 906, wherein a terminal for which communication resources are to be assigned is identified. Next, at block 908, it is determined whether the terminal identified at block 906 is subject to a persistent resource assignment. If it is determined at block 908 that the terminal identified at block 906 is subject to such an assignment, methodology 900 can continue to block 910, wherein a bundled assignment for communication resources and associated ACK resources from the persistent resource pool created at block 904 is transmitted to the terminal. In accordance with one aspect, an assignment of ACK resources to a terminal with a persistent resource assignment can be explicitly made in connection with the bundled assignment transmitted at block 910 as described supra with respect to, for example, methodology 800. In one example, a bundled assignment can be transmitted at block 910 using L2 signaling, L3 signaling, and/or any other appropriate means. Further ACK resources provided to a terminal in the bundled assignment at block 910 can be determined based on an index of the terminal as illustrated by diagram 500.

Alternatively, if it is determined that the terminal identified at block 906 is not subject to a persistent resource assignment, the terminal can be regarded as a scheduled terminal. Accordingly, methodology 900 can continue to block 912, wherein ACK resources from the scheduled resource pool created at block 904 are assigned to the terminal via communication over a control channel. In one example, ACK resources can be implicitly assigned at block 912 based on ah index of a control channel over which an associated terminal communicates as illustrated by diagram 500.

Figure 10:
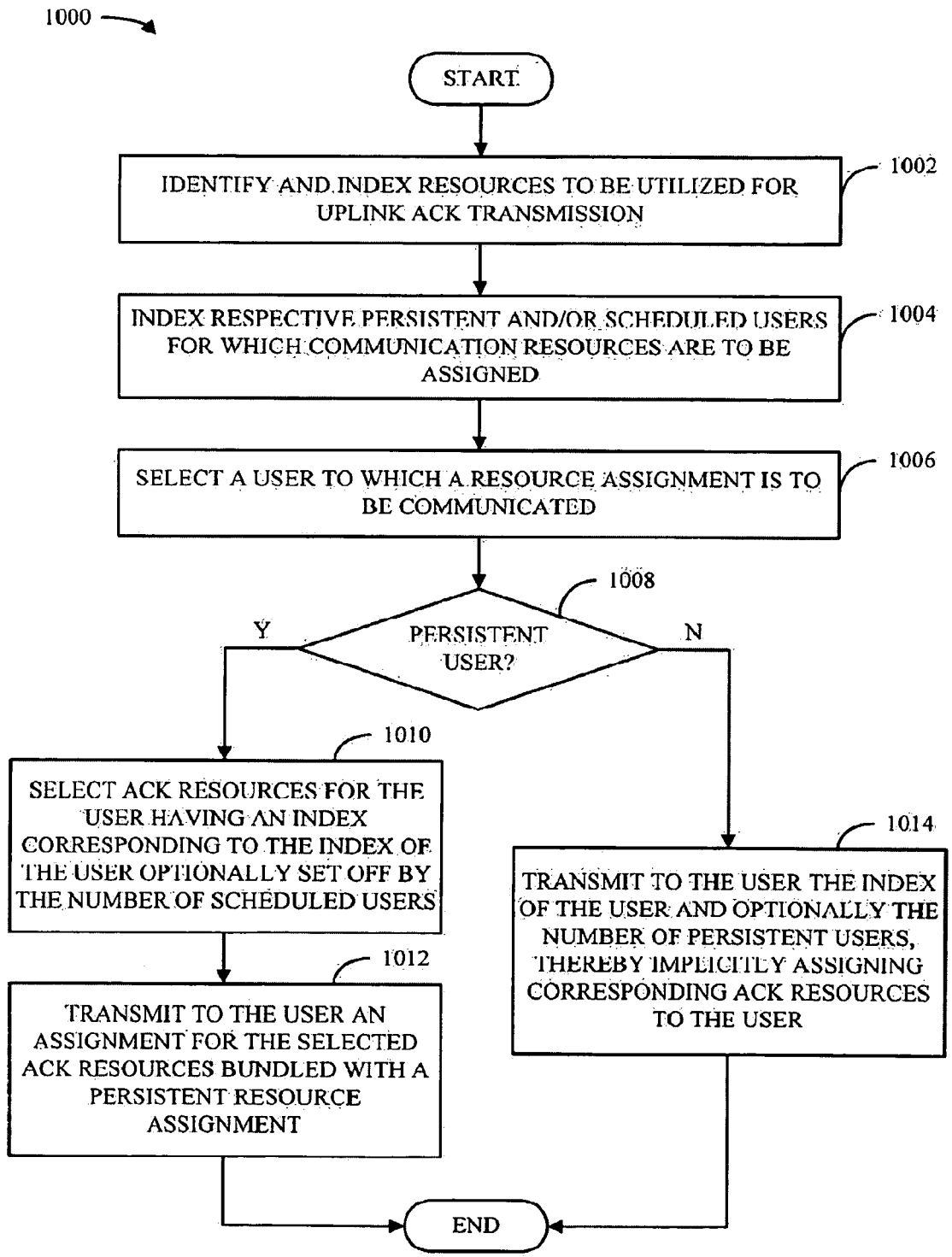

Turning to FIG. 10, illustrated is a methodology 1000 for acknowledgement resource assignment, for persistent users and scheduled users. Methodology 800 can be performed by, for example, an access point and/or any other appropriate network entity. Methodology 1000 begins at block 1002, wherein resources to be utilized for uplink ACK transmission are identified and indexed. In accordance with one aspect, resources can be identified and/or indexed at block 1002 as a single resource pool that is shared between persistent users and scheduled users, as illustrated by diagrams 600 and 700. Further, ACK resources for persistent and scheduled users can be indexed such that the resources are grouped together in the pool. For example, ACK resources for persistent users can be grouped and indexed to occupy a first portion of a common resource pool as illustrated by diagram 600, or alternatively ACK resources for scheduled users can be grouped and indexed to occupy a first portion of a common resource pool as illustrated by diagram 700.

Next, methodology 1000 can continue to block 1004, wherein respective persistent and/or scheduled users (e.g., persistent UEs 420 and/or scheduled UEs 430) for which communication resources are to be assigned are indexed. In one example, indexes can be assigned to users at block 1004 by grouping persistent and/or scheduled users in a similar manner to the grouping conducted for the resource pool at block 1002. Methodology 1000 can then proceed to block 1006, wherein a user to which a resource assignment is to be communicated is selected. Next, at block 1008, it is determined whether the user identified at block 1006 is a persistent user.

If a positive determination is reached at block 1008, methodology 1000 continues to block 1010, wherein ACK resources for the identified user are selected that have an index (as assigned at block 1002) corresponding to the index of the user (as assigned at block 1004) optionally set off by the number of scheduled users. More particularly, if the resource pool is created at block 1002 such that persistent users occupy a first portion of the pool (e.g., as illustrated by diagram 600), the selected ACK resources can correspond to the index of the selected persistent user. Otherwise, if the resource pool is created at block 1002 such that scheduled users occupy a first portion of the pool (e.g., as illustrated by diagram 700), the selected ACK resources can correspond to the index of the selected persistent user set off by the number of scheduled users in the system. Methodology 1000 can then conclude at block 1012, wherein an assignment for the ACK resources selected at block 1010 is bundled with a persistent resource assignment and transmitted to the selected user.

If, instead, a negative determination is reached at block 1008, it can be assumed that the selected user is a scheduled user. Thus, methodology 1000 can instead conclude at block 1014, wherein the index of the selected scheduled user and, optionally, the number of persistent users in the system are transmitted to the selected user, thereby implicitly assigning corresponding ACK resources to the user. For example, if scheduled users occupy a first portion of the resource pool created at block 1002 (e.g., as illustrated by diagram 700), an index can be transmitted at block 1008 without the number of persistent users in the system to facilitate use of ACK resources by the selected user at an index corresponding to the scheduled index of the user. Otherwise, if persistent users occupy a first portion of the resource pool created at block 1002 (e.g., as illustrated by diagram 600), the number of persistent users in the system can additionally be given to the selected user to allow the selected user to identify the correct index for ACK resources to be utilized by the user, thereby preventing overlap between ACK resources used by multiple users.

Figure 11:
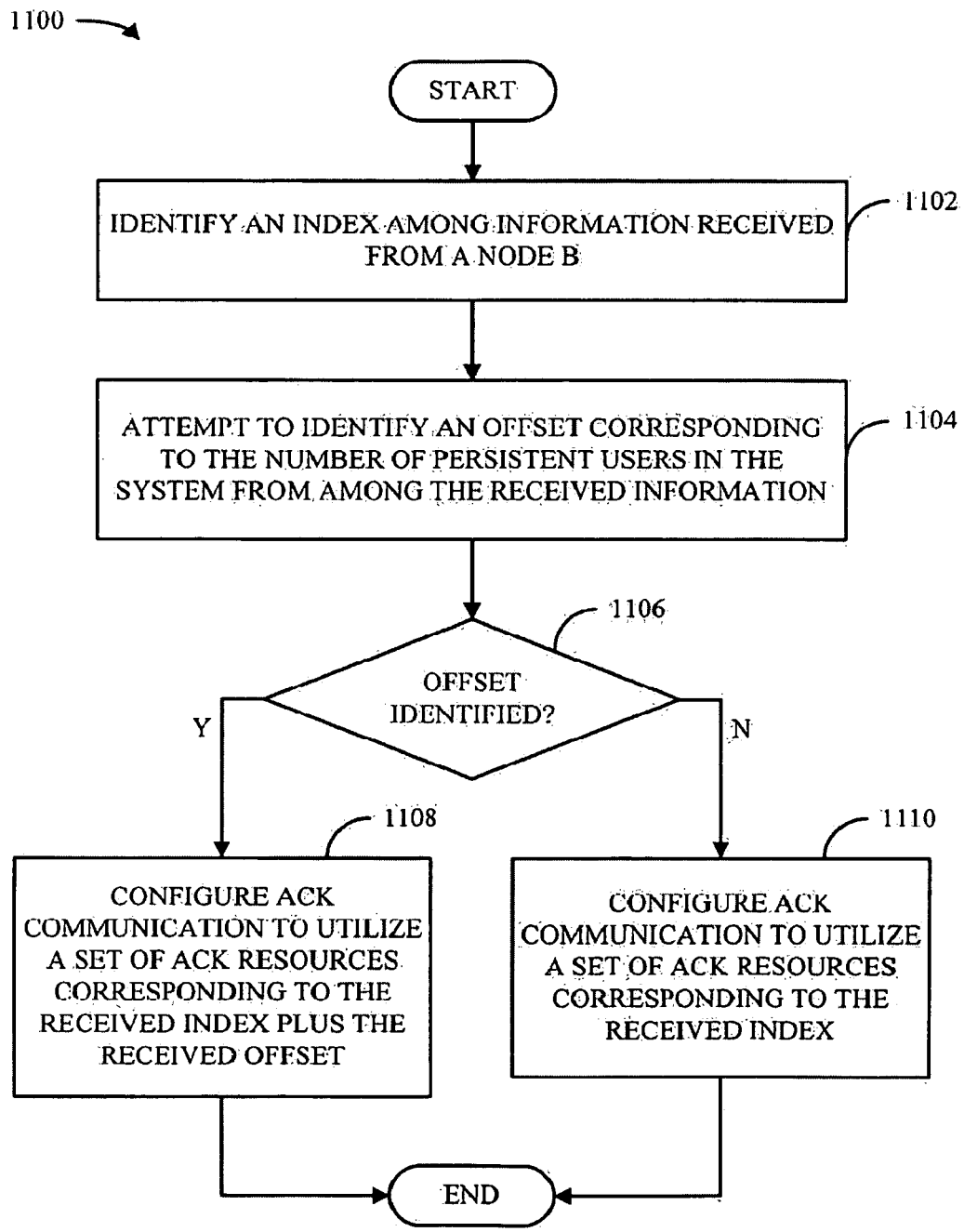
FIG. 11 is a flow diagram of a methodology for determining acknowledgement resources based on information received from a Node B.

FIG. 11 illustrates a methodology 1100 for determining acknowledgement resources based on information received from a Node B (e.g., Node B 410). It is to be appreciated that methodology 1100 can be performed by, for example, a UE (e.g., scheduled UE 430) and/or any other appropriate network entity. Methodology 1100 begins at block 1102, wherein an index is identified among information received from a Node B. An index received at block 1102 can correspond to an index of an entity performing methodology 1100 as maintained by the Node B, the index of a control channel with which the entity performing methodology 1100 communicates with the Node B, and/or any other appropriate information. In one example, an index received at block 1102 can additionally correspond to an index of an associated ACK resource location allocated by the Node B.

Methodology 1100 can then proceed to block 1104, wherein the entity performing methodology 1100 attempts to identify an offset corresponding to the number of persistent users in the system from among the information received at block 1102. Next, at block 1106, it is determined whether such an offset has been identified. If an offset is identified, the entity performing methodology 1100 can infer that ACK resources have been allocated as a shared resource pool for both scheduled users and persistent users such that the persistent users occupy the lower-indexed resources in the resource pool (e.g., as illustrated by diagram 600). Accordingly, methodology 1100 can proceed to block 1108, wherein the entity performing methodology 1100 configures ACK communication to utilize a set of ACK resources at a location corresponding to the index received at block 1102 plus the offset received at block 1104.

On the other hand, if no offset is identified at block 1106, the entity performing methodology 1100 can infer that ACK resources have either been allocated in separate resource pools for scheduled users and persistent users (e.g., as illustrated by diagram 500) or that ACK resources for scheduled and persistent users have been allocated in a common resource pool such that scheduled users occupy lower-indexed resources (e.g., as illustrated by diagram 600). In either case, methodology 1100 can proceed to block 1110, wherein the entity performing methodology 1100 configures. ACK communication to utilize a set of ACK resources corresponding to the index received at block 1102.

Figure 12:
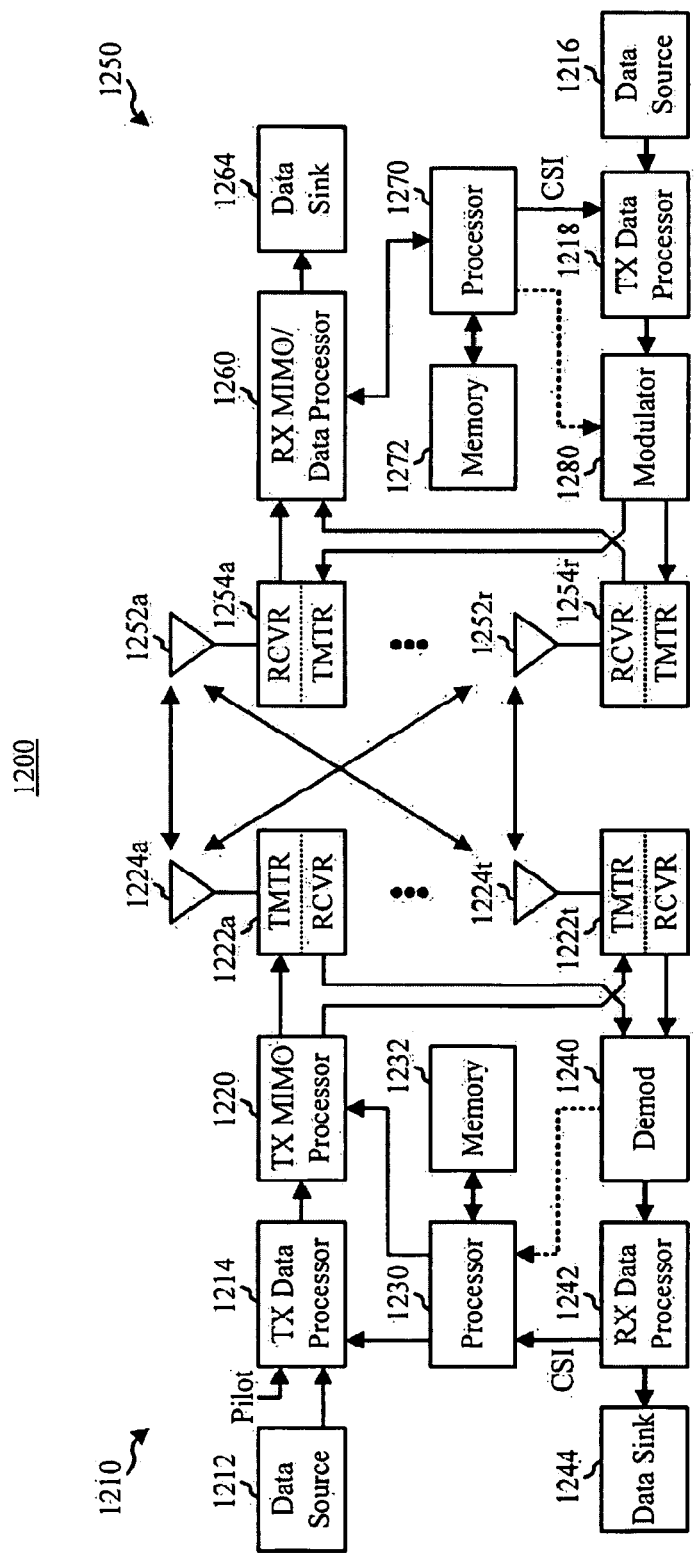
FIG. 12 is a block diagram illustrating an example wireless communication system in which various aspects described herein can function.

Referring now to FIG. 12, a block diagram illustrating an example wireless communication system 1200 in which one or more aspects described herein can function is provided. In one example, system 1200 is a multiple-input multiple-output (MIMO) system that includes a transmitter system 1210 and a receiver system 1250. It should be appreciated, however, that transmitter system 1210 and/or receiver system 1250 could also be applied to a multi-input single-output system wherein, for example, multiple transmit antennas (e.g., oh a base station), can transmit one or more symbol streams to a single antenna device (e.g., a mobile station). Additionally, it should be appreciated that aspects of transmitter system 1210 and/or receiver system 1250 described herein could be utilized in connection with a single output to single input antenna system.

In accordance with one aspect, traffic data for a number of data streams are provided at transmitter system 1210 from a data source 1212 to a transmit (TX) data processor 1214. In one example, each data stream can then be transmitted via a respective transmit antenna 1224. Additionally, TX data processor 1214 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1250 to estimate channel response. Back at transmitter system 1210, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1230.

Next, modulation symbols for all data streams can be provided to a TX processor 1220, which can further process the modulation symbols (e.g., for OFDM). TX MIMO processor 1220 can then provides $N_T$ modulation symbol streams to $N_T$ transceivers 1222a through 1222t. In one example, each transceiver 1222 can receive and process a respective symbol stream to provide one or more analog signals. Each transceiver 1222 can then further condition (e.g., amplify, filter, and upconvert) the analog signals to provide a modulated signal suitable for transmission over a MIMO channel. Accordingly, $N_T$ modulated signals from transceivers 1222a through 1222t can then be transmitted from $N_T$ antennas 1224a through 1224t, respectively.

In accordance with another aspect, the transmitted modulated signals can be received at receiver system 1250 by $N_R$ antennas 1252a through 1252r. The received signal from each antenna 1252 can then be provided to respective transceivers 1254. In one example, each transceiver 1254 can condition (e.g., filter, amplify, and downconvert) a respective received signal, digitize the conditioned signal to provide samples, and then processes the samples to provide, a corresponding "received" symbol stream. An RX MIMO/data processor 1260 can then receive and process the $N_R$ received symbol streams from $N_R$ transceivers 1254 based on a particular receiver processing technique to provide $N_T$ "detected" symbol streams. In one example, each detected symbol stream can include symbols that are estimates of the modulation symbols transmitted for the corresponding data stream. RX processor 1260 can then process each symbol stream at least in part by demodulating, deinterleaving, and decoding each detected symbol stream to recover traffic data for a corresponding data stream. Thus, the processing by RX processor 1260 can be complementary to that performed by TX MIMO processor 1220 and TX data processor 1214 at transmitter system 1210. RX processor 1260 can additionally provide processed symbol streams to a data sink 1264.

In accordance with one aspect, the channel response estimate generated by RX processor 1260 can be used to perform space/time processing at the receiver, adjust power levels, change modulation rates or schemes, and/or other appropriate actions. Additionally, RX processor 1260 can further estimate channel characteristics such as, for example, signal-to-noise-and-interference ratios (SNRs) of the detected symbol streams. RX processor 1260 can then provide estimated channel characteristics to a processor 12120. In one example, RX processor 1260 and/or processor 12120 can further derive an estimate of the "operating" SNR for the system. Processor 12120 can then provide channel state information (CSI), which can comprise information regarding the communication link and/or the received data stream. This information can include, for example, the operating SNR. The CSI can then be processed by a TX data processor 1218, modulated by a modulator 1280, conditioned by transceivers 1254a through 1254r, and transmitted back to transmitter system 1210. In addition, a data source 1216 at receiver system 1250 can provide additional data to be processed by TX data processor 1218.

Back at transmitter system 1210, the modulated signals from receiver system 1250 can then be received by antennas 1224, conditioned by transceivers 1222, demodulated by a demodulator 1240, and processed by a RX data processor 1242 to recover the CSI reported by receiver system 1250. In one example, the reported CSI can then be provided to processor 1230 and used to determine data rates as well as, coding and modulation schemes to be used for one or more data streams. The determined coding and modulation schemes can then be provided to transceivers 1222 for quantization and/pr use in later transmissions to receiver system 1250. Additionally and/or alternatively, the reported CSI can be used by processor 1230 to generate various controls for TX data processor 1214 and TX MIMO processor 1220. In another example, CSI and/or other information processed by RX data processor 1242 can be provided to a data sink 1244.

In one example, processor 1230 at transmitter system 1210 and processor 1270 at receiver system 1250 direct operation at their respective systems. Additionally, memory 1232 at transmitter system 1210 and memory 1272 at receiver system 1250 can provide storage for program codes and data used by processors 1230 and 1270, respectively. Further, at receiver system 1250, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 13:
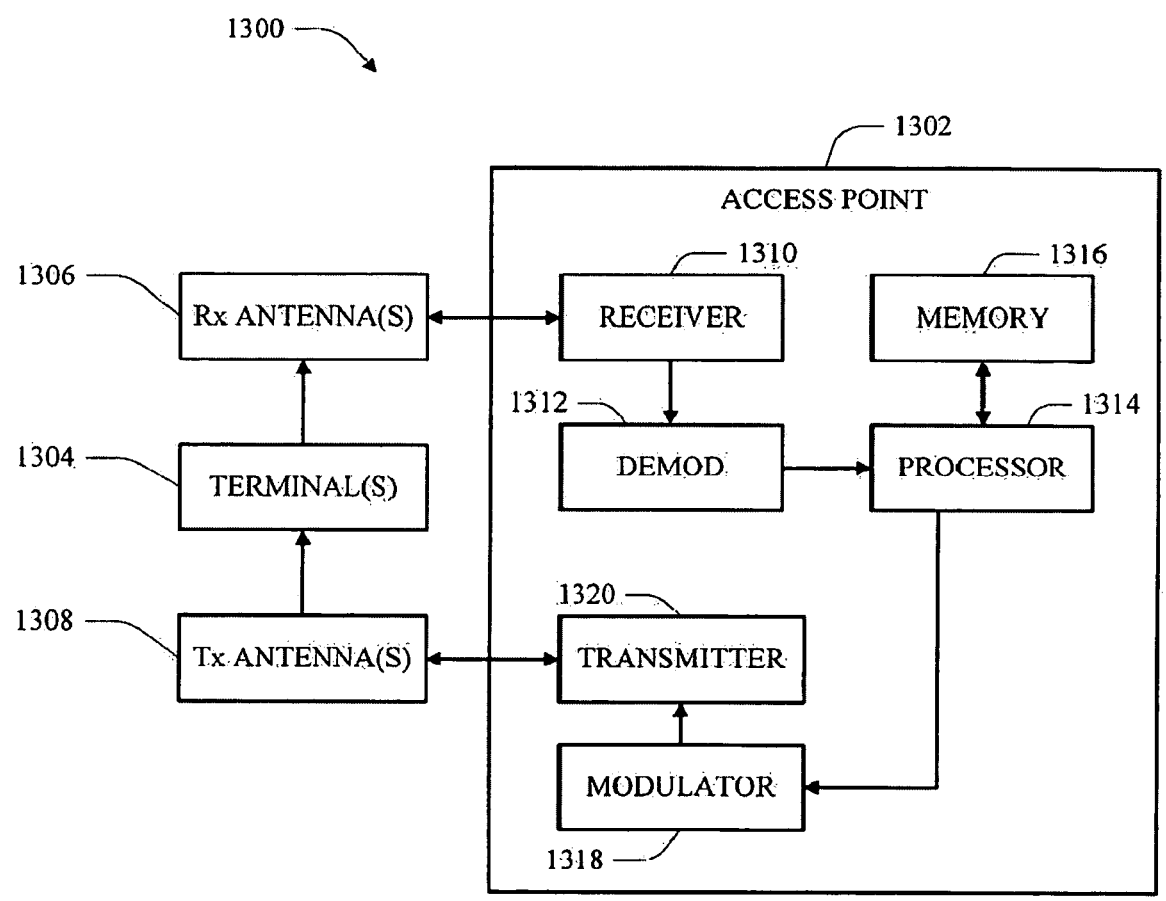
FIG. 13 is a block diagram of a system that coordinates allocation of uplink acknowledgement resources in accordance with various aspects.

FIG. 13 is a block diagram of a system that coordinates allocation of uplink acknowledgement resources in accordance with various aspects described herein. In one example, system 1300 includes a base station or access point 1302. As illustrated, access point 1302 can receive signal(s) from one or more access terminals 1304 and/or an access gateway (not shown) via one or more receive (Rx) antennas 1306 and transmit to the one or more access terminals 1004 and/or the access gateway via one or more transmit (Tx) antennas 1308.

Additionally, access point 1302 can comprise a receiver 1310 that receives information from receive antenna(s) 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. In one example, access point 1302 can employ processor 1314 to perform methodologies 800, 900, 1000, and/or other similar and appropriate methodologies. Access point 1302 can also include a modulator 1318 that can multiplex a signal for transmission by a transmitter 1320 through transmit antenna(s) 1308.

Figure 14:
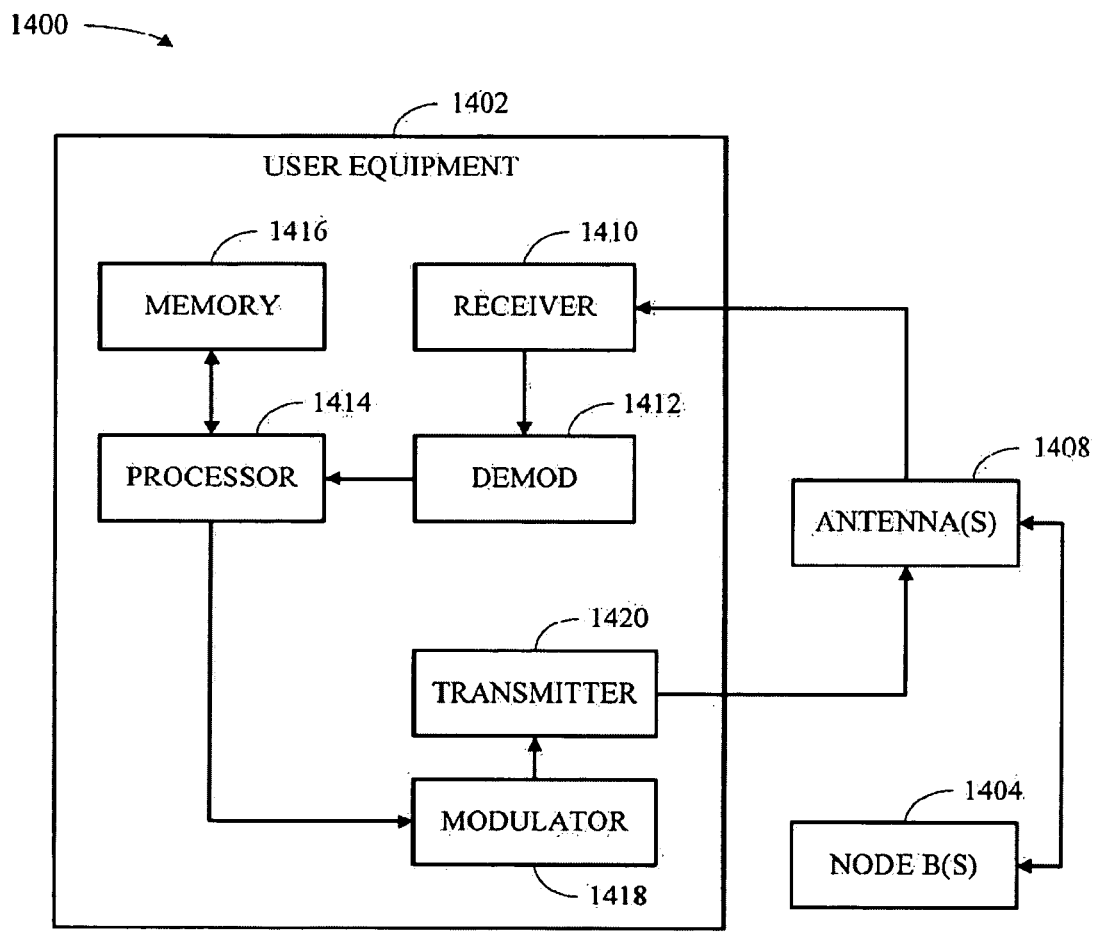
FIG. 14 is a block diagram of a system that coordinates identification of acknowledgement resources and communication thereon in accordance with various aspects.

FIG. 14 is a block diagram of a system that coordinates identification of acknowledgement resources and communication thereon in accordance with various aspects described herein. In one example, system 1400 includes a terminal or user equipment (UE) 1402. As illustrated, UE 1402 can receive signal(s) from one or more Node Bs 1404 and transmit, to the one or more Node Bs 1404 via one or more antennas 1408. Additionally, UE 1402 can comprise a receiver 1410 that receives information from antenna(s) 1408. In one example, receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to UE 1402. Additionally, UE 1402 can employ processor 1414 to perform methodology 1100 and/or other similar and appropriate methodologies. UE 1402 can also include a modulator 1418 that can multiplex a signal for transmission by a transmitter 1420 through antenna(s) 1408.

Figure 15:
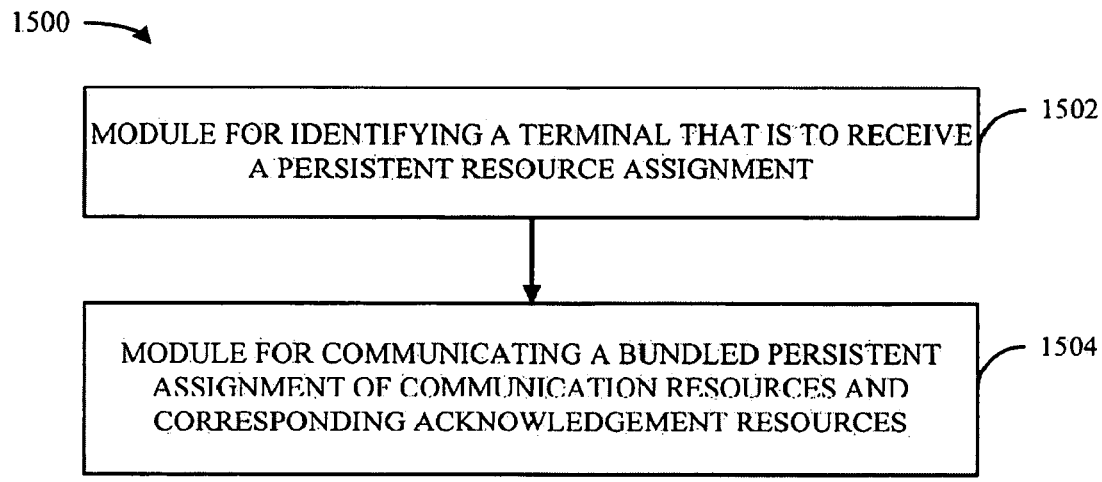
FIG. 15 is a block diagram of an apparatus that facilitates allocating resources for communication of an acknowledgement.

FIG. 15 illustrates an apparatus 1500 that facilitates allocating resources for communication of an acknowledgement. It is to be appreciated that apparatus 1500 is represented as including functional blocks, which can be functional blocks that represent functions implemented by a processor, software, or combination thereof (e.g., firmware). Apparatus 1500 can be implemented in a Node B (e.g., Node B 410) and/or another suitable network entity and can include a module 1502 for identifying a terminal that is to receive a persistent resource assignment, and a module 1504 for communicating a bundled persistent assignment of communication resources and corresponding acknowledgement resources.

Figure 16:
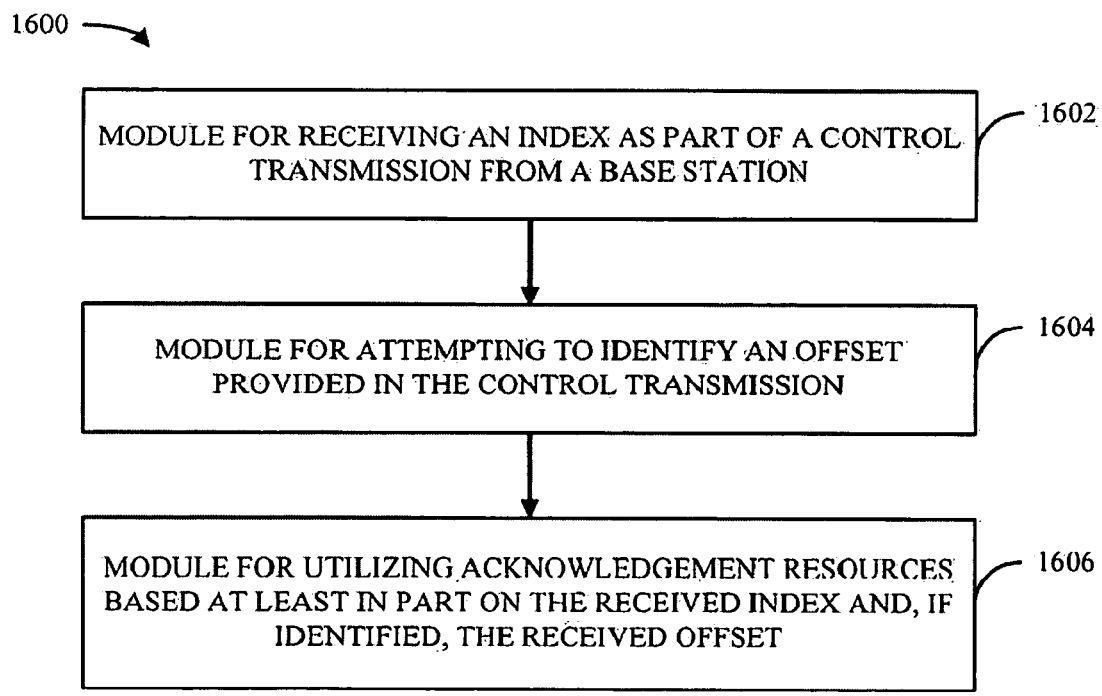
FIG. 16 is a block diagram of an apparatus that facilitates determining resources to be used for communication of an acknowledgement from received index information.

FIG. 16 illustrates an apparatus 1600 that facilitates determining resources to be used for communication of an acknowledgement from received index information. Apparatus 1600 is also represented as including functional blocks, which can be functional blocks that represent functions implemented by a processor, software, or combination thereof. Apparatus 1600 can be implemented in a UE (e.g., scheduled UE 430) and/or another suitable network entity and can include a module 1602 for receiving an index as part of a control transmission from a base station, a module 1604 for attempting to identify an offset provided in the control transmission, and a module 1606 for utilizing acknowledgement resources based at least in part on the received index and, if identified, the received offset.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples, of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for assigning uplink acknowledgement (ACK) resources for a user equipment (UE) in a wireless communication system, comprising:
    identifying a UE for which a persistent assignment of communication resources for a plurality of data transmissions is to be established;
    identifying uplink ACK resources of a shared uplink control channel for use by the identified UE;
    communicating an explicit assignment of the identified uplink ACK resources via Layer 3 (L3) signaling, or a downlink control channel, or both L3 signaling and the downlink control channel to the identified UE for the persistent assignment of communication resources to the UE, without sending an assignment of uplink ACK resources for each of the plurality of data transmissions pursuant to the persistent assignment, wherein the communicating comprises communicating an uplink ACK index corresponding to the identified uplink ACK resources on the downlink control channel via Layer 2 (L2) signaling; and
    receiving ACK feedback sent on the uplink ACK resources by the identified UE.

2. The method of claim 1, wherein the communicating comprises communicating information related to the identified uplink ACK resources in a message on a downlink data channel via the L3 signaling.

3. The method of claim 1, further comprising:
    allocating uplink ACK resources for one or more first UEs with one or more persistent resource assignments and one or more second UEs that are scheduled via one or more control channels.

4. The method of claim 3, wherein the allocating comprises
    allocating uplink ACK resources for the one or more first UEs from a first resource pool, and
    allocating uplink ACK resources for the one or more second UEs from a second resource pool.

5. The method of claim 4, further comprising:
    allocating a first set of one or more whole resource blocks for the first resource pool, and allocating a second set of one or more whole resource blocks for the second resource pool.

6. The method of claim 4, further comprising:
allocating a first portion of available uplink ACK resources for the first resource pool, and
allocating a second portion of the available uplink ACK resources that is disjoint from the first portion thereof for the second resource pool.

7. The method of claim 4, further comprising:
indexing the one or more persistent resource assignments to the one or more first UEs;
indexing the one or more control channels utilized for scheduling the one or more second UEs;
indexing the first resource pool and the second resource pool;
assigning uplink ACK resources to a first UE at least in part by matching an index associated with a persistent resource assignment to the first UE to an index in the first resource pool; and
assigning uplink ACK resources to a second UE at least in part by matching an index associated with a control channel that schedules the second UE to an index in the second resource pool.

8. The method of claim 3, wherein the allocating comprises allocating uplink ACK resources for the one or more first UEs and the one or more second UEs from a common pool of uplink ACK resources.

9. The method of claim 8, further comprising:
maintaining a first index set for the one or more persistent resource assignments to the one or more first UEs;
maintaining a second index set for the one or more control channels utilized for scheduling the one or more second UEs; and
indexing uplink ACK resources in the common pool of uplink ACK resources.

10. The method of claim 9, further comprising:
assigning uplink ACK resources to a second UE that is scheduled with a control channel at least in part by transmitting an index of the control channel as maintained in the second index set to the second UE.

11. The method of claim 9, further comprising:
assigning uplink ACK resources to a first UE with a persistent resource assignment at least in part by selecting uplink ACK resources from the common pool of uplink ACK resources having an index corresponding to an index of the persistent resource assignment to the first UE offset by an amount of uplink ACK resources assigned to the one or more second UEs.

12. The method of claim 9, further comprising:
assigning uplink ACK resources to a second UE that is scheduled with a control channel at least in part by transmitting to the second UE an index of the control channel as maintained in the second index set and an offset determined by an amount of uplink ACK resources assigned to the one or more first UEs.

13. The method of claim 9, further comprising:
assigning uplink ACK resources to a first UE with a persistent resource assignment at least in part by selecting uplink ACK resources from the common pool of uplink ACK resources having an index corresponding to an index of the persistent resource assignment to the first UE.

14. A wireless communications apparatus, comprising:
a memory that stores data relating to a wireless terminal for which communication resources are to be persistently assigned and a set of acknowledgement (ACK) resources of a shared uplink control channel; and
a processor configured to identify ACK resources to be used by the wireless terminal from the set of ACK resources, to communicate a persistent assignment of downlink communication resources for a plurality of data transmissions to the wireless terminal, to communicate an explicit assignment of the identified ACK resources via Layer 3 (L3) signaling, or a downlink control channel, or both L3 signaling and the downlink control channel to the wireless terminal without sending an assignment of uplink ACK resources for each of the plurality of data transmissions pursuant to the persistent assignment, wherein the explicit assignment comprises an uplink ACK index corresponding to the identified uplink ACK resources on the downlink control channel via Layer 2 (L2) signaling, and to receive ACK feedback sent on the selected ACK resources by the wireless terminal.

15. The wireless communications apparatus of claim 14, wherein the processor is further configured to communicate information related to the explicit assignment of the identified ACK resources in a message on a downlink data channel via the L3 signaling.

16. The wireless communications apparatus of claim 14, wherein the processor is further configured to allocate ACK resources from the set of ACK resources for one or more first wireless terminals with one or more persistent resource assignments and one or more second wireless terminals that communicate when scheduled via one or more control channels.

17. The wireless communications apparatus of claim 16, wherein the processor is further configured to allocate ACK resources for the one or more first wireless terminals from a first set of ACK resources and to allocate ACK resources for the one or more second wireless terminals from a second set of ACK resources.

18. The wireless communications apparatus of claim 17, wherein the processor is further configured to index the one or more persistent resource assignments to the one or more first wireless terminals, to index the one or more control channels used for scheduling the one or more second wireless terminals, to maintain indices for the first set of ACK resources and the second set of ACK resources, to assign ACK resources to a first wireless terminal at least in part by matching an index of a persistent resource assignment associated with the first wireless terminal to an index in the first set of ACK resources, and to assign ACK resources to a second wireless terminal at least in part by matching an index of a control channel for the second wireless terminal to an index in the second set of ACK resources.

19. The wireless communications apparatus of claim 16, wherein the processor is further configured to allocate ACK resources for the one or more first wireless terminals and the one or more second wireless terminals from a shared set of ACK resources.

20. The wireless communications apparatus of claim 19, wherein the processor is further configured to index the one or more persistent resource assignments to the one or more first wireless terminals, to index the one or more control channels used for scheduling the one or more second wireless terminals, and to maintain indices for the shared set of ACK resources.

21. The wireless communications apparatus of claim 20, wherein the memory further stores data relating to a second wireless terminal that communicates according to a schedule provided by a control channel.

22. The wireless communications apparatus of claim 20, wherein the memory further stores data relating to a first wireless terminal with a persistent resource assignment and a number of second wireless terminals that are scheduled by control channels, and wherein the processor is further configured to select ACK resources for the first wireless terminal from the shared set of ACK resources based on an index of the persistent resource assignment to the first wireless terminal and the number of second wireless terminals.

23. The wireless communications apparatus of claim 20, wherein the memory further stores data relating to a second wireless terminal that communicates according to a schedule provided by a control channel and a number of first wireless terminals having persistent resource assignments, and wherein the processor is further configured to transmit the number of first wireless terminals to the second wireless terminal.

24. The wireless communications apparatus of claim 20, wherein the memory further stores data relating to a first wireless terminal with a persistent resource assignment, and wherein the processor is further configured to select ACK resources for the first wireless terminal from the shared set of ACK resources and to explicitly signal an indication of the selected ACK resources to the first wireless terminal.

25. An apparatus that facilitates allocation of acknowledgement (ACK) resources in a wireless communication system, comprising:
  means for identifying uplink ACK resources of a shared uplink control channel for an access terminal to which a persistent assignment of communication resources for a plurality of data transmissions is to be communicated;
  means for communicating an explicit assignment of the identified uplink ACK resources via Layer 3 (L3) signaling, or a downlink control channel, or both L3 signaling and the downlink control channel to the access terminal for the persistent assignment of communication resources, without sending an assignment of uplink ACK resources for each of the plurality of data transmissions pursuant to the persistent assignment, wherein the means for communicating communicates an uplink ACK index corresponding to the identified uplink ACK resources on the downlink control channel via Layer 2 (L2) signaling; and
  means for receiving ACK feedback sent on the identified uplink ACK resources by the access terminal.

26. The apparatus of claim 25, further comprising:
  means for allocating the identified uplink ACK resources for the access terminal for the persistent assignment of communication from a first resource pool; and
  means for allocating uplink ACK resources for a scheduled access terminal from a second resource pool.

27. The apparatus of claim 25, further comprising means for allocating the identified uplink ACK resources for the access terminal for the persistent assignment of communication resources and uplink ACK resources for a scheduled access terminal from a common resource pool.

28. A non-transitory computer-readable medium, comprising:
  code for causing a computer to identify acknowledgement (ACK) resources of a shared uplink control channel for a user with a persistent resource assignment for a plurality of data transmissions in a wireless communication system;
  code for causing the computer to send an explicit assignment for the identified uplink ACK resources via Layer 3 (L3) signaling, or a downlink control channel, or both L3 signaling and the downlink control channel to the user for the persistent resource assignment to the user, without sending an assignment of uplink ACK resources for each of the plurality of data transmissions pursuant to the persistent assignment, wherein the explicit assignment comprises an uplink ACK index corresponding to the identified uplink ACK resources on the downlink control channel via Layer 2 (L2) signaling; and
  code for causing the computer to receive ACK feedback sent on the identified uplink ACK resources by the user.

29. The non-transitory computer-readable medium of claim 28, wherein the code for causing a computer to identify ACK resources for a user in a wireless communication system comprises code for causing the computer to allocate ACK resources for the user for the persistent resource assignment from a first resource pool that is disjoint from a second resource pool used for allocating ACK resources for users with scheduled communication resources.

30. The non-transitory computer-readable medium of claim 28, wherein the code for causing a computer to identify ACK resources for a user in a wireless communication system comprises code for causing the computer to allocate ACK resources for the user for the persistent resource assignment from a common resource pool that is used for allocating ACK resources for users with persistently assigned communication resources and users with scheduled communication resources.

31. An integrated circuit that executes computer-executable instructions for coordinating resources for uplink acknowledgement (ACK) transmission, the instructions comprising:
  identifying resources for uplink ACK transmission of a shared uplink control channel for a user equipment (UE) to be persistently assigned downlink communication resources for a plurality of data transmissions;
  sending an explicit assignment of the identified ACK resources via Layer 3 (L3) signaling, or a downlink control channel, or both L3 signaling and the downlink control channel to the UE for a persistent assignment of downlink communication resources to the UE, without sending an assignment of uplink ACK resources for each of the plurality of data transmissions pursuant to the persistent assignment, wherein the explicit assignment comprises an uplink ACK index corresponding to the identified uplink ACK resources communicated on the downlink control channel via Layer 2 (L2) signaling; and
  receiving ACK feedback sent on the identified ACK resources by the UE.

32. The integrated circuit of claim 31, the instructions further comprising:
  allocating resources for uplink ACK transmission, from a first pool of resources, to one or more first UEs with one or more persistent resource assignments; and
  allocating resources for uplink ACK transmission, from a second pool of resources, to one or more second UEs that utilize scheduled downlink communication resources.

33. The integrated circuit of claim 31, the instructions further comprising:
  allocating resources for uplink ACK transmission, from a common pool of resources, to one or more first UEs for one or more persistent resource assignments and one or more second UEs that utilize scheduled downlink communication resources.

* * * * *